Jan. 26, 1965     G. T. RANDOL     3,166,907
COMPOUND MASTER CYLINDER FOR HYDRAULIC BRAKE SYSTEMS
Filed June 16, 1961     4 Sheets-Sheet 1

Inventor

Fig. 2

Inventor

United States Patent Office 3,166,907
Patented Jan. 26, 1965

3,166,907
COMPOUND MASTER CYLINDER FOR
HYDRAULIC BRAKE SYSTEMS
Glenn T. Randol, 3 E. 2nd Ave., Loch Lynn,
Mountain Lake Park, Md.
Filed June 16, 1961, Ser. No. 126,404
9 Claims. (Cl. 60—54.6)

This invention relates to hydraulic brake sytsems such as employed on automotive vehicles and the like, the invention having particular reference to the construction and operation of a novel and improved compound master cylinder unit for producing a two-stage pressurizing function on the fluid in the several remotely located brake-actuating cylinders associated with the vehicle brakes.

In the art of compound master cylinders, the problems of simplicity, and therefore of keeping the cost within the range of the conventional single-stage master cylinder, have received considerable attention, but due to structural requirements essential to produce a two-stage pressurizing device, prior art devices of this character are complicated and costly since the operating mechanism thereof must necessarily be incorporated in a body especially designed for such mechanism, and also have the fault common to all of producing erratic reaction on the brake-pedal during transition from low- to high-pressure operation, rather than utilizing the conventional master cylinder body for economy in association with simplified operating mechanism capable of pressurizing the fluid in two stages without noticeable change in pedal "feel" at the point of transition between said stages.

Therefore, the primary object of my invention is to advance the art by contributing a novel two-stage master cylinder of the last-mentioned type which is characterized by a low-pressure unit operably associated with the conventional master cylinder body, to produce therewith a high-pressure unit and an interposed poppet-type staging-valve operable by intermediate pressure conditions induced jointly by the fluid-displacement members in both units when moved initially as a unit to effect pressure build-up free of "lag" during transition from one unit to the other in response to incremental movement of the brake-pedal, and thereby successfully apply high pressure braking force smoothly and efficiently with the result, that in the last stage or phase of the braking operation, when it is often desired to firmly apply the brakes, such may be accomplished with reduced pedal effort free of chattering and/or fluctuation of the high-pressure displacement member acting on the fluid in the brake lines.

A further important object is to provide an improved frictionally-operated low pressure compensating valve which is adapted to positively condition the low-pressure cylinder to pressurize the fluid therein in response to initial movement of the piston in said cylinder, such initial movement also activating the high-pressure piston simultaneously with the low-pressure piston, to close the compensating port for the high-pressure cylinder and thereby condition the latter to pressurize the fluid therein supplementally to the pressurizing function of the low-pressure cylinder until a predetermined back pressure is effective to operate the staging valve to effect transition from the low- to high-pressure operation.

An object related to the object next above, is to interconnect the high-pressure compensating port with a compensating passage serving the low-pressure cylinder, the port, however, being uncovered when the high-pressure piston is fully retracted while the passage may be opened and closed at closely positioned stations along the full operating stroke of both pistons moving as a unit without uncovering said port, thus providing fluid replenishment for both cylinders in response to "pumping" the brake-pedal to insure against possible cavitation in the brake lines and loss-of-pedal under severe braking operations.

Still another object of the invention is to provide a two-stage fluid pressurizing operation in the conventional master cylinder body which enables initial displacement of brake fluid at low pressure and high velocity, and transition to high pressure and low velocity upon a predetermined back-pressure from the high pressure being encountered, and thereafter, the brakes may be applied with proportionally higher pressures or effective leverage between the brake-pedal and brakes, said low pressure phase being effective to quickly take up the slack in the hydraulic system in response to incremental initial pedal movement.

A further more specific object is to provide a novel poppet-type valve system comprising a poppet-type staging valve, a compensating-valve and a check-valve operatively associated with a stationary sleeve member, and correlated in a novel manner so as to control passageways therein, whereby the low-pressure chamber is conditioned to displace fluid through certain of said passageways to take up the slack in the brake system followed by smooth transition from low pressure to high pressure to effectively apply the brakes as required, and to accommodate quick release of the brakes from any applied condition upon release of the brake-pedal. The staging-valve is preferably of the poppet-type to sensitize the transitory phase of the braking operation and thereby reduce overall pedal travel to a minimum to attain high pressure conditions, while the check-valve has a spring-loaded movable element for controlling certain passageways through which low pressure fluid is discharged into the high-pressure chamber, and the compensating-valve is adapted to control other of said passageways in said sleeve member to condition the low-pressure chamber to displace fluid at low pressure in large volume via said certain passageways through the said check-valve, said compensating-valve having an element movable to block the open ends of said other passageways in response in part to fluid under pressure in said low-pressure chamber, said blocking operation being supplemented by movement of the high-pressure piston-carrying member transmitted to the movable element of said compensating-valve by a novel frictional connection or clutch, to move said element to unblock said other passageways in response to opposite movement of said piston-carrying member thereby insuring positive opening and closing of the compensating-valve.

With these and other objects and advantages in view, the invention consists of the new and novel combination, construction, and arrangement of the parts as hereinafter more fully described, set forth in the claims appended hereto, and disclosed in the accompanying drawings forming a part hereof, wherein:

On the accompanying drawings I have used the reference character "MC" to indicate as a whole a master cylinder operatively incorporating the components comprising the present invention. This novel master cylinder is preferably of the type capable of being mounted on the engine side of the vehicle firewall 5 in the manner shown in FIGURE 1, operation of the master cylinder being effected by a suspended-type pedal "P" pivotally mounted on a bracket indicated by a fragmentary portion "BR," and which is attached at its forward end to the driver side of said firewall in a well known manner as shown in this figure wherein the conventional wheel brake generally designated "WB" is illustrated with its wheel cylinder 8 hydraulically connected to said master cylinder by a branched hydraulic line 9.

Figure 1:
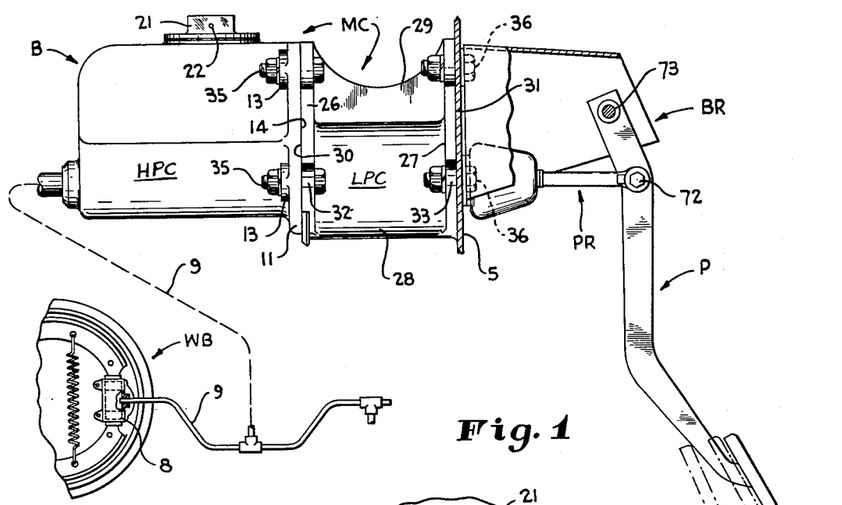
FIGURE 1 is a side elevation of the conventional master cylinder body embodying my invention, and shown connected diagrammatically to operate the hydraulic brake system on a motor vehicle.
Figure 2:
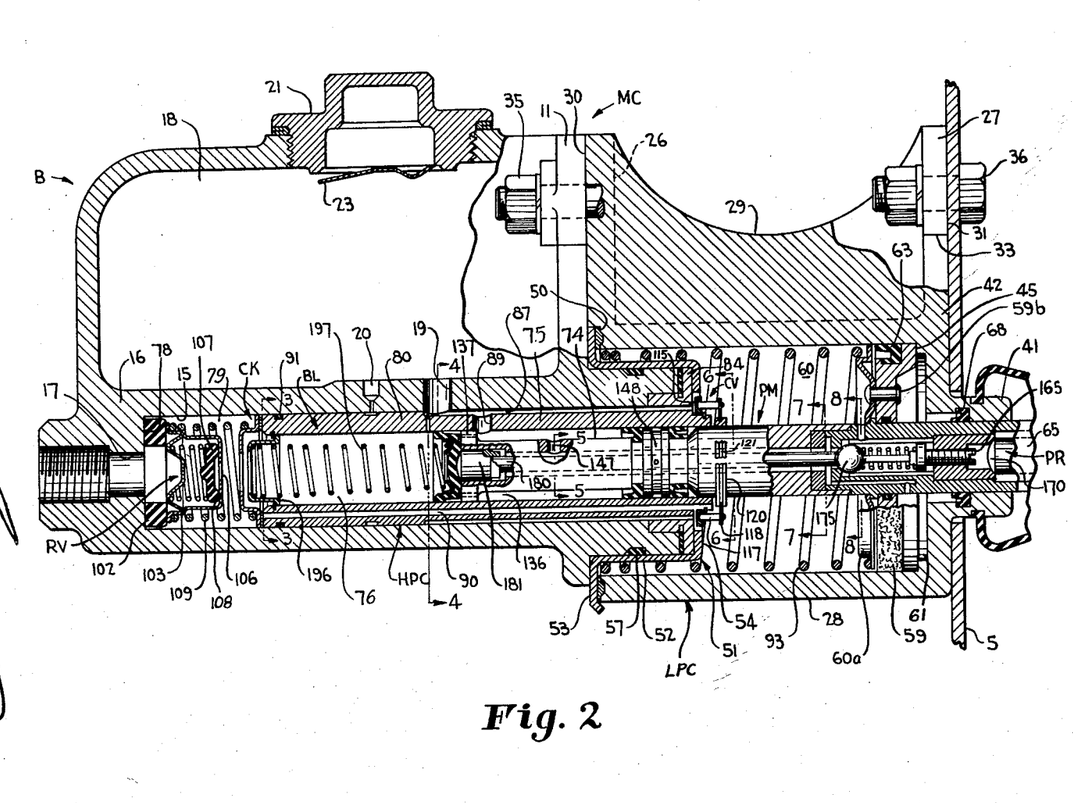
FIGURE 2 is a longitudinal vertical section on an enlarged scale of the master cylinder body and associated low-pressure cylinder with the parts shown in normal brake "off" disposition. The fluid symbol has been omitted to avoid obscuring the details.

The conventional master cylinder body "B" has an integrated mounting flange 11 defining the rear end portion thereof, and which is provided with radially projecting integral ears 13 (usually four in number as shown), said flange terminating in a smoothly finished surface 14. The body B has a cylindrical wall provided with an inner finished longitudinal bore 15 open at one end and closed at the other end by a wall 16 through which a fluid discharge port 17 passes in continuous communication with the hydraulic brake lines 9 as shown in FIGURE 1. A fluid supply reservoir 18 formed in the body preferably above the bore 15 for gravitational feed into said bore via the primary intake port 19 through said wall. A normally open compensating port 20 spaced forwardly from said intake port, is provided through said bore wall, and which is permanently blocked as will appear. A removable filler cap 21 for the reservoir is provided with a breather vent 22 and a baffle member 23 underlying said vent to prevent fluid-surge from discharging fluid through said vent, said cap being adapted to close an internally threaded opening 24 by threaded engagement therewith as shown all being of conventional construction.

A low-pressure unit or cylinder generally designated "LPC" is operatively disposed between the finished surface 14 on the body mounting flange 11, and the engine side of the vehicle firewall 5, said unit having spaced terminating flanges 26, 27 which integrally interconnect an intermediate cylindrical portion 28. A reinforcing integral web 29 spans the space above the cylindrical portion between said flanges to stiffen the upper portions of said flanges which are of similar configuration to that of the body mounting flange 11.

The flanges 26 and 27 terminate in smooth finished surfaces 30, 31, respectively, and are provided with ears 32, 33 respectively similar to those on the mounting flange 11 as shown. Registering holes 34 are provided through the ears on the three flanges aforesaid; namely, 11, 26 and 27, to enable mating flanges 11 and 26 to be securely united as by bolts 35 or otherwise, and the flange 27 is attached to the engine side of the firewall 5 as by bolts 36 or otherwise, projecting through the holes in this latter flange and aligned holes 37 through the firewall 5, to mount the master cylinder MC in operating position on the vehicle best demonstrated in FIGURES 1 and 2.

Projecting rearward from the finished surface 14 on the flange 11 is a hollow hub 38 coaxial with the bore 15, and defining the open end thereof is a counterbore 39 merging with the bore 15 to provide therewith an internal annular shoulder 40, and projecting in a similar manner from the finished surface 31 on the flange 27 is another hollow hub 41 coaxial with the first-mentioned hub.

The low-pressure cylinder LPC is closed at its rear end, preferably by an integral wall 42, and the forward end thereof is open. The cylindrical portion 28 is provided with a finished surface cylindrical bore 44 coaxially related to the counterbore 39 and bore 15, the rear (right) end of bore 44 terminates in a finished annular shoulder 45 defined by a reduced diameter circular recess 46 in the end wall which merges with a counterbore 47 and an axial bore 48 coextensive with said last-mentioned hub, said counterbore 47 and axial bore 48 defining an internal annular shoulder 49.

The outer marginal portion of the open end of the longitudinal bore 44 is formed with an annular recess 50 offset from the finished surface 30 on the mounting flange 26. A tubular sealing sleeve 51 comprises a cylindrical body 52 terminating at its forward end in an outturned annular flange 53 and its opposite rear end terminating into an inturned annular flange 54 which defines the marginal portion of a circular opening 55. The outturned flange 53 lies in said recess 50 normally flush with the finished surface 30 on the flange 26, and an annular seal or gasket 56 is disposed between the bottom of the recess 50 and confronting face on the outturned flange whereby in the assembled status of the flanges 11, 26 a fluid-tight seal is effected between the said flanges. The body 52 of the sealing sleeve telescopically receives the hub 38, the end of which is spaced from the inturned flange 54 for an important purpose to become apparent. An O-ring packing 57 is carried in an external annular groove 58 in the hub 38 whereby sealing is provided between the exterior of the hub 38 and tubular sleeve 51. As shown in FIGURE 2, the sleeve body 52 is spaced from the cylindrical surface defining the bore 44. The dimension between the forward face of the outturned flange 53 and the forward face on the inturned flange 54 is slightly less than the length of the hub 38 so that when longitudinal tension is placed on the said sleeve flanges by the bolts which secure flanges 11, 26 together, the open end of the low-pressure cylinder is closed fluid-tight.

Reciprocably mounted in the bore 44 of the low-pressure cylinder LPC is a low-pressure piston 59, and which definies a variable low-pressure working chamber 60 on the forward side thereof, and a constant (atmospheric) pressure chamber 61 on the rear side thereof. An annular groove 62 is provided in the peripheral surface of the piston 59 which is fitted with a complemental packing 63 or the like suitably sealing the piston 59 against the working surface of bore 44. Integrally, or preferably interconnected with the piston 59 is a coaxial piston-carrying member generally designated "PM" which projects through a central circular opening 59a in the piston wall in pressfitted sealed relation therewith as shown to move as a unit. Attached to the forward face of the piston 59 as by a plurality of rivets 59b as shown, is a circular plate 59c of slightly less diameter than said piston. This plate is forwardly offset adjacent its periphery to provide a cylindrical wall portion 60a normal to the vertical wall portion 60b to serve as a spring seat to which reference will be made later. The central portion of said plate is also forwardly offset and which is provided with a circular opening 60c of substantially the same diameter as the opening 59a through which the piston-carrying member PM passes as shown. The offset in the central portion of the plate defines an annular space 60d with the forward face portion on the piston 59 adjacent the member PM, said space being adapted to receive an annular thrust shoulder 64 integral with the piston-carrying member PM as shown in FIGURE 2, to thus provide the interconnection between the piston 59 and said member PM whereby these two components move as a unit in both directions. That portion of the member PM extending to the right of said piston 59 will hereinafter be referred to as a cylindrical extension 65 which projects rearwardly through the counterbore 47 and axial bore 41 in intimate engagement with the latter bore to slidably support the piston-carrying member PM.

Encircling the exterior of said extension 65 is preferably an annular single-lip pliant seal 67, the inner marginal portion of its vertical wall 68 engaging an internal annular groove 69 in the counterbore 47, adjacent the shoulder 49 in said hub to stabilize said seal on the hub as shown in FIGURE 2, and thereby prevent fluid loss from the chamber 61 past the extension 65 to the exterior of the low-pressure cylinder LPC. The rearward end of the extension is provided with an inwardly extending counterbore 70 for reception of one end of a push-rod "PR" pivotally connected at its opposite end to the brake-pedal at 72, said pedal being swingable from a shaft 73 suitably mounted on said bracket BR, the forward end of said bracket being secured to the driver side of the firewall 5 under the heads of bolts 36.

That portion of the piston-carrying member PM which projects forwardly of the low-pressure piston will hereinafter be referred to as a high-pressure displacement member or extension 74 which has its forward or left end portion slidably interfitting an elongated tubular member 75 and defines a high-pressure working chamber 76 to provide a high-pressure unit or cylinder generally designated "HPC," said tubular member being fixed in close tolerance relationship with bore 15 and disposed with its inner end 77 spaced from the confronting inner face 78 on the end wall 16 to provide a low-high pressure discharge chamber 79 therebetween, said tubular member being disclosed herein as a sleeve-type cylinder liner generally designated "BL" of novel construction and comprising: a normal cylindrical wall 80 having inner and outer finished surfaces 81, 82, respectively, and an enlarged diameter portion 83 defining the rear end portion which terminates in an outturned annular flange at 84 disposed in the space aforesaid between the rear end of the hub 38 and inturned flange 54 on the sealing sleeve 51. The rear end of the hub 38 and the outturned flange 84 have an interposed annular sealing gasket 85 whereby, longitudinal tension impressed on said sleeve flanges 53, 54 by bolts 35 which secure flanges 11, 26 together in metal-to-metal contact as a consequence of the hub 38 being fractionally longer than the dimension between the forward faces on the flanges 53, 54, is transmitted to the flange 84 to impinge the gasket 85 in effective sealing relationship between said hub end and last-mentioned flange, and thereby locks the bore liner BL in the bore 15 and, at the same time, effectively closes the open end of the variable low-pressure chamber 60 in fluid-tight sealed relation with respect to the flange 11 as shown in FIGURE 2. An annular shoulder 86 is formed by the enlarged diameter portion 83 and which abuts the internal annular shoulder 40 in the hub 38. An annular fluid space 87 encircles the bore liner BL, said fluid space having continuous communication with the primary intake port 19 leading to the fluid reservoir 18, and, as shown in FIGURE 2, the normal compensating port 20 is closed by the normal wall 80 of the liner BL, and a new location is provided for said compensating port through the wall of the annular fluid space at 88, and spaced rearwardly thereof is a secondary intake port 89 through said wall in continuous communication with annular space 87. The bore liner BL, as shown in FIGURE 2, is drilled or otherwise provided with a plurality of circumferentially spaced fluid communication passages 90 co-extensive therewith and which provide communication between the low-pressure phase of the braking operation as will become apparent. To prevent seepage from the discharge chamber 79 via the bore liner BL, an O-ring packing 91 is incorporated in an annular groove 92 in spaced relation between the port 88 and inner end of the bore liner BL. A normally preloaded compression spring 97 encircles that portion of the piston-carrying member PM operative within the low-pressure chamber 60, with its opposite ends reacting between the sleeve flange 53 and the peripheral confronting surface on the low-pressure piston 59 to bias the latter toward its normally released position shown in FIGURE 2 wherein pressures in chambers 60, 61 are equalized at atmospheric level.

High pressure check-valve means generally designated "CK" are associated with the forward end 77 of the bore liner BL, and comprise: a movable cup shaped element 95 provided with a circular aperture 96 through its vertical wall 97, a horizontal cylindrical wall 98 interconnecting the vertical wall with an annular flange 99 normal to said horizontal wall, said flange having a bonded or otherwise applied facing 100 which abuts the forward end 77 of the bore liner BL and thereby serves to close the passages 90 to inhibit fluid flow from said low-high discharge chamber 79 into the variable low-pressure chamber 60 but enabling fluid flow from said low-pressure working chamber 60 into the discharge chamber 79 until a predetermined back-pressure in this latter chamber occurs.

A removable ring-like valve seat 102, preferably made of non-metallic material such as rubber, encircles the inner end of the discharge port 17 in intimate contact with the finished surface on the end wall 16 as shown. A residual pressure check-valve assembly generally designated "RV" is provided with a cup-shaped housing 103 having a central opening 104 through its end wall 105, and its open end is formed with an outturned annular flange 106 disposed parallel to the said end wall to movably engage the seat 102, said check-valve assembly including a one-way discharge check-valve 107 spring-biased in opposition to fluid displacement from the discharge chamber 79 into engagement with an annular valve seat 108 defining the marginal portion of the central opening, and a normally preloaded compression spring 109 reacting between the aforesaid check-valve element 95 and the flange 106 to control the check-valves CK and RV whereby the passages 90 are normally closed to prevent fluid exit from said discharge chamber 79, but adapted to accommodate fluid entrance to said discharge chamber from said low-pressure working chamber 60 via said passages 90, while the residual valve assembly RV functions under control of the spring 109 to establish a minimal pressure on the fluid in the brake lines 9 when the vehicle brakes WB are fully released as is understood.

Figures 3, 4, 6, 9:
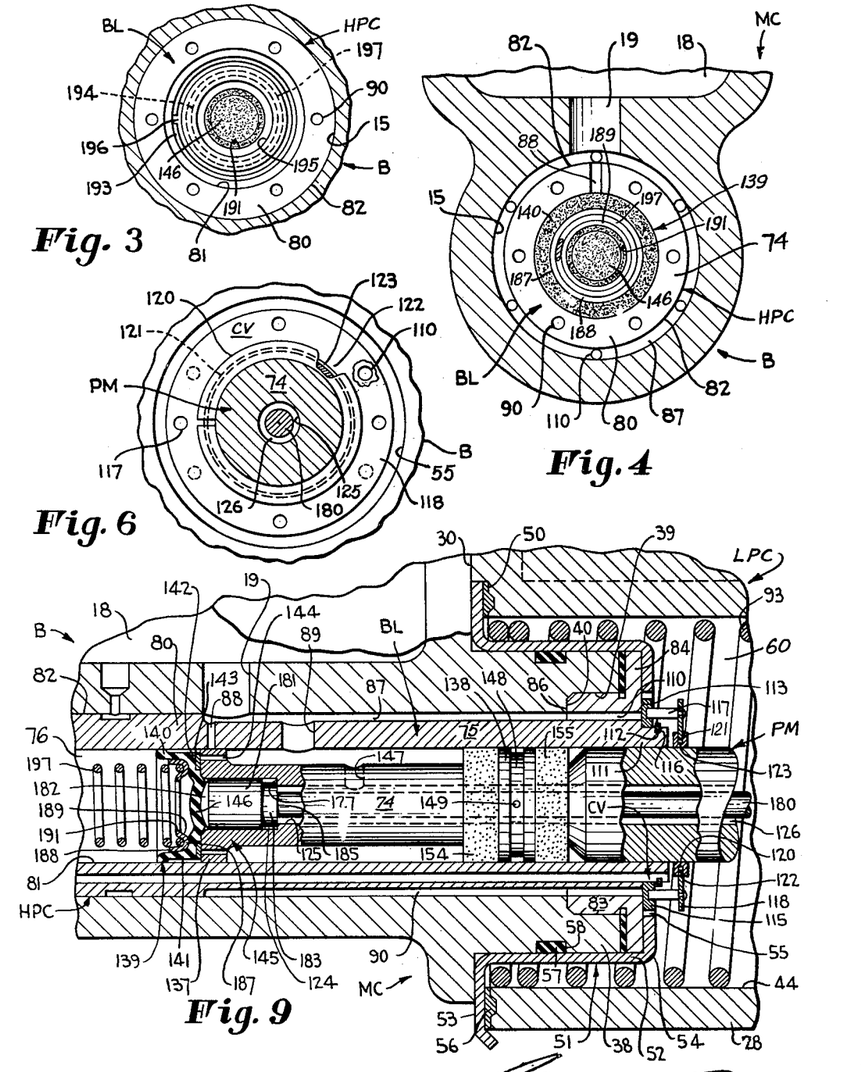
FIGURE 3 is a transverse section taken along the line 3—3 of FIGURE 2 showing structural details of the high pressure check-valve for controlling low-pressure fluid passages in the high-pressure cylinder.
FIGURE 4 is another transverse section taken along the line 4—4 of FIGURE 2 showing details of the low-pressure passages in the high-pressure cylinder and associated compensating port in continuous communication with the intake port of the conventional master cylinder body.
FIGURE 6 is another transverse section taken along the line 6—6 of FIGURE 2 showing details of the low-pressure compensating valve for controlling compensating passages in the high-pressure cylinder leading to the fluid supply reservoir, said compensating valve being actuatable to close said compensating passages under joint influence of low-pressure conditions and movement of the low-pressure piston.
FIGURE 9 is a view of a fragmentary portion of FIGURE 2 showing an operated status wherein high-pressure operation is activated.
Figure 5:
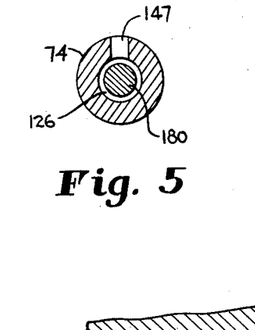
FIGURE 5 is another transverse section taken along the line 5—5 of FIGURE 2 showing the piston-carrying member and co-axial actuating rod for the staging valve element.
Figure 7:
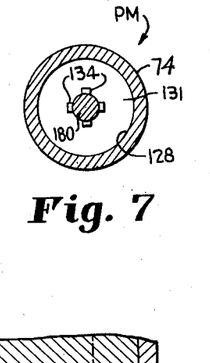
FIGURE 7 is another transverse section taken along the line 7—7 of FIGURE 2 showing the fluted bearing support for the end of the valve operating rod adjacent the staging-valve poppet element.
Figure 8:
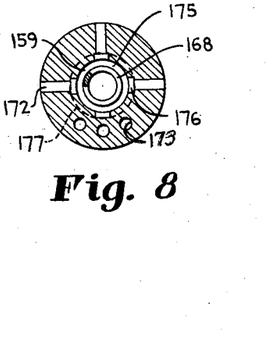
FIGURE 8 is another transverse section taken along the line 8—8 of FIGURE 2 showing further details of the staging poppet valve and associated passageways controlled thereby.

The rear enlarged diameter portion 83 of the bore line BL, as depicted in FIGURE 2, is drilled or otherwise provided with another plurality of circumferentially spaced fluid communicating passages 110 coextensive therewith, and which normally interconnect the said annular fluid space 87 with the low-pressure working chamber 60 whereby pressure on the fluid therein is equalized to that of atmosphere. The passages 90 and 110 are circumferentially staggered with respect to one another as shown in FIGURES 3 and 4 respectively.

Low pressure compensating-valve means generally designated "CV" are operatively associated with the rear (right) ends of said passages 110 which open into the low-pressure chamber 60, to control fluid flow therethrough. Therefore, the passages 110 serve as fluid compensating means for the low-pressure working chamber 60 in a manner similar to the function of the compensating port 88 controlled by the forward end of the high-pressure displacing member 75. Projecting into the low-pressure chamber 60 from the rear flanged end of the bore liner BL, is a reduced diameter terminating portion 111 provided with an annular groove 112 spaced from the wall 113 of the flanged end of said liner. Slidably disposed on this reduced portion is a movable ring-like valve-forming element 115 adapted to overlie the aforesaid ends of passages 110, and normally disposed in abutment with a split retaining ring 116 adapted to engage in said groove 112, said valve element 115 when contiguous to said ring 116 is spaced from the ends of said passages to establish fluid communication between the annular fluid space 87 therefore reservoir 18 and the low-pressure working chamber 60, and thereby establish atmospheric pressure on the fluid contained in said latter chamber. Projecting rearwardly from the valve element 115, is a plurality of circumferentially spaced pins 117 radially offset from the axis of the master cylinder MC, and, as shown in FIGURE 2, said pins are sufficiently spaced radially to clear the retaining ring 116 and serve to join a ring-like member 118 and said valve element 115 in axially spaced relationship, to have limited unitary movement on the reduced portion 111 as shown, to open (unblock) and to close (block) the cooperating ends of said passages 110. Operatively incorporated between the inner peripheral portion of the ring-like member 118 and the outer diameter of the piston-member PM, is a split contractible actuating ring 120, said actuating ring being slidably mounted on the piston-member PM as shown in FIGURE 2 to have frictional engagement therewith for actuation thereby to impart unitary reciprocable movement to the valve element 115 and member 118, and thereby control opening and closing of the passages 110 with a greater degree of positiveness than possible where fluid-pressure actuation is alone relied upon. An external annular groove 121 is provided in the actuating ring 120, for reception of an inner marginal portion 122 of the ring-like member 118 to interconnect these two components for axial movement as a unit while accommodating limited relative radial movement therebetween, it being noted that the depth of the groove 121 is slightly greater than the thickness of the engaging marginal portion on the ring-like member 118 for limited radial movement when installed, and, of course, the annular space 123 obtaining between said member 118 and actuating ring 120 will increase as wear occurs in the ring as a result of slipping engagement on the piston-member PM when the latter is actuated in the same direction beyond the position effecting incremental movement of the valve element 115 to open or close the passages 110. Thus, the compensating-valve means CV when actuated to either of its positions of fluid control with respect to passages 110, the frictional coefficient obtaining between the actuating ring 120 and piston-member PM enables the latter member to continue in the same direction relative to the actuating ring after the latter ring and valve element 115 have been moved as a unit to open or close the passages 110.

The aforesaid opening and closing actuations of the compensating-valve means CV may be effected at very closely spaced stations along the full operating stroke of the piston-member PM as a function of incremental reciprocable movements relayed to the valve element 115 by the actuating ring 118, for limited actuation of the latter element as a unit with said piston-member, that is to say, a corresponding incremental movement of the low-pressure piston 59 in a pressurizing direction effects closure of the passages 110 by the compensating-valve means CV to condition the low-pressure working chamber 60 to pressurize the fluid to take-up the slack in the brake system, and upon release of the low-pressure piston 59 from any given pressurizing position, such incremental movement inaugurating such releasing the low-pressure piston to take the brakes "off," is simultaneously transmitted through the actuating ring 120 to withdraw element 115 from wall 113 to open passages 110, and thereby, relieve the pressure on the fluid in chamber 60 to that of atmosphere, and thereafter, continued movement of the low-pressure piston back to normally released (inoperative) position as shown in FIGURE 2, maintains the compensating-valve means CV withdrawn, thus enabling two-directional fluid flow between the reservoir 18 and chamber 60, such movement of the piston 59 being accommodated by slipping engagement of the piston-member PM relative to the actuating ring 120 which becomes stabilized at either of its two closely spaced operating positions of fluid control. Similarly, the compensating-valve means CV are maintained closed along the full operating stroke of the piston 59 in a pressurizing direction, after initial movement thereof correspondingly moves the valve element 115 into contact with the wall 113 to close the confronting ends of the passages 110 as shown in FIGURE 9 wherein the valve element 115 is stabilized in spaced relation to the retaining ring 116. In this latter operation, it is important to note that pressure on the fluid in the low-pressuring working chamber 60 cooperates with the force effective on the actuating ring 120 under piston-member actuation, to stabilize the element 115 seated against the annular face portion on the wall 113 defining the inner flanged end of the cylinder liner BL. The confronting ends of the passage 110 terminate flush with said face portion, therefore when the valve element 115 is seated as shown in FIGURE 9, fluid flow through said passages is prevented (blocked) to condition the low-pressure working chamber 60 to displace fluid in large volume at low velocity through the passages 90 controlled by check-valve means CK for low-pressure operation. Accordingly, the compensating-valve means CV are actuatable in response to incremental reciprocable movements at closely spaced stations along the full operating stroke of the low-pressure piston 59 supplemented by pressure on the fluid in the low-pressure working chamber 60 reacting to maintain the passages 110 closed upon mechanical closure by said actuating ring 120 under operation by said piston-member.

Again referring to the piston-member PM, it will be further noted that the forward extension thereof is formed at its extreme end with a counterbore 124 which merges with an intermediate elongated axial bore 125 to provide a fluid space 126, juncture of said bores defining an internal annular shoulder at 127. The rear end of the axial bore 125 merges with another counterbore 128 which defines the rear end of the left section, it being necessary for production and assembly purposes to produce this extension in two sections so that the poppet-type staging valve can be incorporated as will appear. The two sections of the extension 75 are joined at 129 by a reduced diameter portion 130 terminating the forward end of the right section, and which is pressfitted or otherwise tightly connected in the open end of the counterbore 128 for rigid assembly of the two sections. An annular spacer 131 is impinged between the forward end of said reduced portion 130 and an annular shoulder 132 formed at the juncture of the axial bore 125 and counterbore 128. This spacer is centrally bored at 133 and the surface of this bore is longitudinally fluted to provide a plurality of fluid passages 134. These passages are adapted to interconnect the rear end of the axial bore 125 with a first annular valve chamber 135 formed by recessing the forward end of the reduced portion 130 as shown. The inner portion of extension 75 which slidably interfits the bore liner BL is provided with an annular fluid space 136 which is in continuous communication with the aforesaid annular fluid space 87 via the secondary intake port 89, and therefore with the supply reservoir 18. Opposite ends of the fluid space 136 are defined by a headland 137 and a fluid-retaining land 138, respectively. The end face of the headland 137 is equipped with a pliant cup seal 139 having a peripheral lip 140 in working contact with the inner working surface 81 of the bore liner BL. The outer surface of the lip is indented with a plurality of longitudinal flutes at 141, and the forward edge thereof normally lies slightly spaced to the rear (right) of the compensating port 88 to accommodate fluid adjustment between the discharge chamber 79 and reservoir 18 as is understood. The heel portion of the lip is offset at 142 to receive a washer-type valve 143 bonded to the cup to control a plurality of fluid passageways 144 through the headland 137 which accommodate flow of fluid via flutes 141 between the discharge chamber 79 and the annular space 136 when the parts are normally disposed as shown in FIGURE 2. The washer valve 143 therefore functions to seal off fluid from entering the discharge chamber 79 when the passageways 144 are closed at the seal end, closure of these passageways being effected by pressure reaction from the discharge chamber 79 jointly induced by the low and high pressure pistons or by the latter piston alone when a firm set up of the vehicle brakes is desired. These passageways are opened by withdrawal of the washer valve 143 from the cooperating ends of the passageways when the brakes are taken "off," such opening of the passageways 144 being induced by a temporary vacuum condition created within the discharge chamber 79 to thus draw fluid from the reservoir into said chamber to prevent cavitation therein and therefore, maintain the hydraulic system filled while taking the brakes "off," whereupon, the compensating port 8 is opened (uncovered) thus enabling any excess fluid in the brake system to return to the reservoir 18, and thereby compensate for any excess or lack of fluid in the system in readiness for another brake-applying operation. Upon full release of the brakes, the residual pressure check-valve RV becomes operative automatically to establish a minimal pressure on the fluid in the brake lines and connected wheel cylinders remote from the discharge chamber 79. The headland 137 and seal 139 combine to form what may be termed a high-pressure piston 145. Since the high-pressure piston 145 and the low-pressure piston 59 jointly influence initial pressure on the fluid in the discharge chamber 79, it may be said that initially, the chamber 79 is under low pressure to take up the slack in the system, and, upon such pressure reaching sufficient intensity to react on check-valve means CK to isolate further low pressures on the fluid in the said chamber, and to oppose movement of the high-pressure piston 145, such reaction serving to effect transition from the low-pressure chamber 60 to the high-pressure conditions in chamber 79 induced by the smaller piston 145 upon disablement of the low-pressure cylinder LPC. The central portion of the cup 139 is formed with a forwardly extending hollow-dome-shaped embossment 146 which will be referred to later.

A port 147 is provided through that portion of the wall of the extension 75 which defines the annular fluid space 136. The fluid-retaining land 138 aforesaid is provided with an external annular groove 148 which is connected by means of a plurality of radial passages 149 to the fluid space defined by the axial bore 125 in the piston-carrying member PM, to convey seepage from either the low-pressure chamber 60 or the annular fluid space 136 back to the reservoir 18 via the port 147 as will appear. External annular grooves 150, 151 are provided on opposite sides of the fluid-retaining land 138, said grooves being engaged by the inner peripheral portions on the vertical walls 152, 153 of a pair of annular pliant seals 154, 155, respectively, to stabilize the concentric lips which characterize this type of seal in sealing position with respect to the fluid-retaining land 138 and their outer lips in working relation with respect to the inner surface of the bore liner BL as shown. Accordingly, these two seals effectively prevent seepage from the annular space 136 and the low-pressure working chamber 60, while groove 148 in the peripheral surface of the fluid-retaining land serves to convey any such seepage to the radial passages 149 and thence into the fluid space 125 coaxial with the piston-carrying member, said port 147 serving to convey any such seepage back into said fluid space 136, thence through the secondary intake port 89, annular space 87 through the primary intake port 19 into the fluid reservoir 18.

The rear extension 65 on the piston-carrying member PM is also provided with a second counterbore 156 interconnecting the first-mentioned counterbore 70, and a blind axial bore 157, the end wall 158 of said bore defining one end of a second valve chamber 159 at the inner end of the right (rear) section of the piston-carrying member. The wall 158 therefore separates the first and second valve chambers best 135, 159 respectively demonstrated in FIGURE 2. An annular internal shoulder 160 is provided at the juncture of the two counterbores 70, 156, and another internal annular shoulder 161 is formed at the juncture of the blind axial bore and said second counterbore, the latter counterbore being fitted with an abutment member 162 which is axially bored at 163 to merge with a counterbore 164 coextensive therewith. The axially bored portion 163 is internally threaded to receive a manually adjustable spring tensioning element 165, the outer end thereof projecting into the counterbore 164 being cross-slotted for reception of a screwdriver bit to enable rotation of the element 165 to its desired adjusted position. The inner end of element 165 is provided with an annular head 166 to receive reaction from one end of a normally preloaded compression spring 168 operably disposed in the valve chamber 159. The outer end of the counterbore 164 is formed to provide a seat 169 engageable by the free rounded end 170 of the push-rod PR whereby operator force exerted on said pedal P is transmitted to the push-rod and thence to the abutment member 162 to actuate the piston-carrying member PM and associated low and high-pressure pistons as a unit in a fluid pressurizing direction. A plurality of ports 172 passes through the wall of the rear section forward of the low-pressure piston 59, to establish fluid communication between the low-pressure working chamber 60 and the interior of the valve chamber 159. A plurality of longitudinal passages 173 is drilled or otherwise incorporated in the wall of the forward portion of the rear section, said passages serving to interconnect the first valve chamber 135 with the constant pressure chamber 61 in the low-pressure cylinder LPC via radial ports 174 incorporated in the wall of said extension 65, to the immediate right of the low-pressure piston 59.

Staging valve means of novel construction and operation are provided and which are generally designated "SV." This valve means comprise: a valve-forming element disclosed herein as a poppet-type ball 175 which is movably mounted in the valve chamber 159, and is adapted to be maintained substantially coaxial with the said chamber by means of a close tolerance rolling fit therewith. The surface of the bore 157 is longitudinally fluted to provide fluid passages 176 so that the fluid may freely circulate around the ball 175 when open, the inner end of said chamber 159 being internally channeled at 177 to facilitate forming said passages. The poppet ball 175 is adapted to receive reaction from the spring 168 to bias the same into seated engagement with a complemental annular valve seat 178 defining the inner end of a port 179 passing through the end wall 158, said port being adapted to place the valve chamber 135 in communication with the valve chamber 159 when the poppet ball is unseated, and therefore chambers 60, 61 are interconnected when the poppet ball is unseated. A valve actuating rod 180 projects through the axial bore 125 to form the fluid space 126 aforesaid into an annular configuration around said rod since the latter is of less diameter than the bore 125. The right end of this rod is adapted to project through the port 179 in minutely spaced relationship with respect to the full diameter of the poppet ball when the latter is seated to close the port 179. A reactive valve-actuating piston 181 is slidably mounted in the counterbore 124, said piston having a complemental dome-shaped end 182 contiguously projecting into the seal embossment 146, with the rear end thereof terminating in a reduced portion 183 formed by diminishing the normal diameter thereof. This reduced portion is provided with a central blind hole 184 adapted to receive and support the forward end of the valve actuating rod 180, the end of said rod engaging the bottom of the hole 184 whereby sliding movement of the reactive piston 181 imparts a like movement to the valve rod. The rear end face 185 on the reactive piston which encircles the valve rod 180 is normally spaced at 186 from the annular shoulder 127 to provide a pair of cooperating abutment-engaging elements which, in conjunction with the poppet element 175 and cooperating seat 178 provide another pair of abutment-engaging elements, define the relative operating movement of the reactive piston 181 and connected poppet valve element 175 from unseated (open) position to seated "closed" position, respectively. Unseating of the poppet valve element 175 being influenced by proportional pressure conditions emanating from the discharge chamber 79 while seating of the said poppet element is effected by the spring 168 when pressure conditions in said discharge chamber 79 are substantially equal to or less than the operating force of said spring. The forward side of the seal 139 is provided with an annular spring seat member 187 adjacent the intersection between the heel of the lip 140 and the embossment 146. This seat member is composed of a pair of forwardly diverging flanges 188, 189. Flange 188 lies on the underside of the heel portion of the lip 140 to radially support the same against inward deformation, while the flange 189 is contiguous with that portion of the vertical wall which merges with the dome-shaped portion of said seal to define a central opening 191 through which the dome portion of the seal 139 is exposed to the discharge chamber 79 to receive proportional hydraulic reaction therefrom and thereby retract said reactive piston 181 engaging the opposite side of said dome portion, to unseat the poppet element 175 and thus disable the low-pressure cylinder.

Figure 2A:
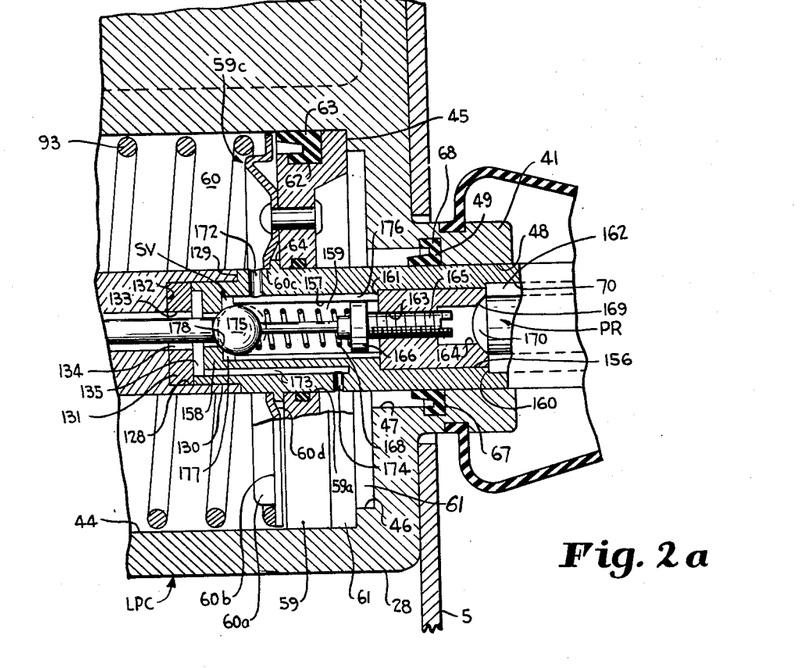
FIGURE 2A is a fragmentary view of FIGURE 2 on an enlarged scale to clarify structure of the central portion of the low-pressure piston and which includes the poppet-type staging valve.

An annular internal groove 192 is provided in the finished surface 81 of the bore liner BL adjacent the inner end 77 thereof. Fitted into this groove is a split retaining ring 193 adapted to serve as an abutment. A stationary spring seat member 194 of cup-shaped configuration is fitted into the bore 81 rearward of the retaining ring 193, said spring seat member having a centrally apertured end wall 195, and the rearward open end thereof terminates in an outturned annular flange 196 which abuts the retaining ring 193 to stabilize the spring seat member in the bore 81. A normally preloaded compression spring 197 is operably mounted in the bore liner BL, the latter defining the high-pressure cylinder HPC. This spring is adapted to react between the seat members 187, 194 to stabilize the seal 139 in its operating position against the headland 137 at the forward end of the piston-carrying member PM to supplement the action of spring 93 in effecting retraction of the operating parts to their respective normal positions as shown in FIGURES 2 and 2A. It is important to observe that the magnitude of the reduced hydraulic reaction from chamber 79 may be varied in accordance with the selected diameter of the reactive piston 181.

Figure 10:
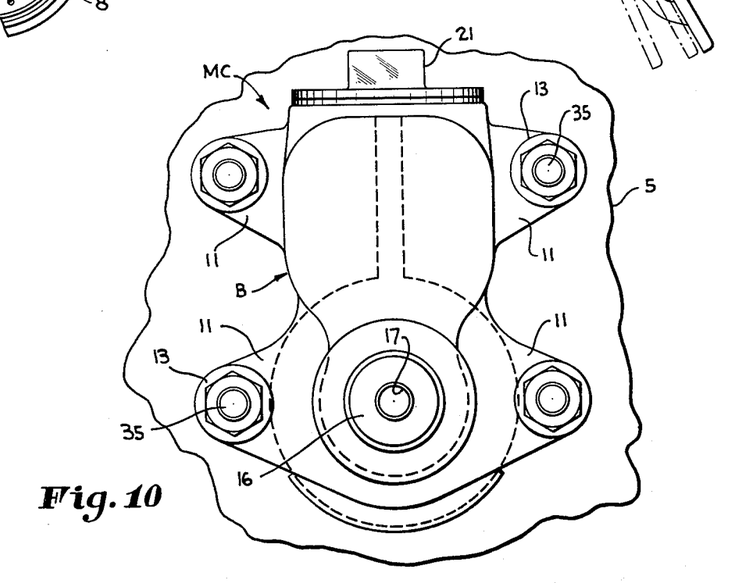
FIGURE 10 is a front elevation showing the unit mounted on the vehicle firewall.

It is therefore seen that at the precise point of counterbalance between the hydraulic reactive force effective on the reactive piston 181 opposed by spring 168, the piston 181 moves to the right as viewed in FIGURE 10 relatively to the piston-carrying member PM to actuate the valve rod 180 rearwardly and thereby bring the right end of the valve rod into engagement with the poppet ball 175 to unseat the same as shown by dashed lines in FIGURES 2 and 2A. This latter operation disables the low-pressure working chamber 60 by interconnecting the chambers 60, 61, since chamber 61 is at all times connected to the fluid supply reservoir 18 via the radial ports 174, passages 173, valve chamber 135, fluid space 126 which encircles the valve rod, port 147, fluid space 135, secondary intake port 89, fluid space 87 and primary intake port 19 as shown in FIGURES 2 and 2A. I have therefore, provided a simple but highly sensitive staging valve for effecting transition from the low-pressure phase to the high-pressure phase with a minimal pressure and stroke of the brake-pedal required. Stated differently, there is no lost-motion in pedal movement to effect operation of this novel poppet-type staging valve since it responds to the pressure factor required to operate it to open position as shown in FIGURE 9 and by dashed lines in FIGURE 2. Accordingly, the constant pressure chamber 61 in the low-pressure cylinder LPC varies the volume of fluid therein to acommodate movement of the piston 59 by expelling or receiving as the case may be, fluid from the fluid supply reservoir 18 via the above described hydraulic circuit. In this manner, the chamber 61 is maintained filled irrespective of the operating status of the low-pressure piston 59.

The manually adjustable element 165 against which the poppet ball spring 168 reacts, provides different preloaded settings of said spring with respect to a normally preloaded status thereof. This means that the spring 168 may be installed under a normally preloaded condition to establish a predetermined reactive pressure from chamber 79 at which transition from low-pressure braking to high-pressure braking is effected, but if this point of transition is desired delayed or advanced for a higher or lower low-pressure condition, respectively, to be effective before the high-pressure phase comes in, then such may be accomplished by merely manually turning the element 165 by a screwdriver in the proper direction, insertion of the screwdriver bit into the counterbore 70 requiring removal of the push-rod PR. Thus, the point of transition between the two stages of braking may be varied in this simple manner, and at the same time requiring less critical production characteristics of this spring with resultant lowering of the manufacturing cost.

*Operation*

It is believed the operation of my improved compound master cylinder MC is manifest from the foregoing description, however, in the interest of further clarification, a brief operational summary will be given as follows:

In operation, initial operator effort applied to the brake-pedal P, is transmitted through the interconnecting push-rod PR to the abutment member 162 pressfitted into the counterbore 70 in the extension 65, to move the piston-carrying member PM therefore the low-pressure piston 59 as a unit from normal disposition shown in FIGURES 1 and 2 to set up the brakes under low-pressure and then effect transition to high-pressure braking operation as required to stop the associated vehicle. During this brake-applying operation, initial movement of the piston-carrying member PM disposes the lip of the high-pressure seal 139 forwardly of the compensating port 88 to close the same and thereby isolate the fluid supply 18 from the discharge chamber 79, to condition said chamber to pressurize the fluid therein and displace the same through the discharge outlet 17 into the brake lines 9 to actuate the wheel cylinders 8 as is understood. At the same time said initial movement of the piston-carrying member occurs, fluid in the low-pressure chamber 60 is being displaced under low-pressure at high velocity through the spring-biased check-valve means CK into the discharge chamber 79, due to compensating-valve means CV having closed the passages 110 in response to pressure on the fluid in said latter chamber 60 and the frictional coefficient obtaining between the actuating ring 120 and the piston-carrying extension 75 to positively isolate the fluid in the reservoir from the low-pressure working chamber 60 and thereby condition this latter chamber to displace fluid therefrom via the passages 90 through check-valve means CK into the discharge chamber 79. The vehicle brakes WB are therefore immediately set up to take-up the slack in the brake system by joint low pressure fluid displacement of the low and high pressure pistons 59, 145 provided closure of the compensating passages 88, 110 preferably occur at the same time. However, closure of the compensating port 88 may be set to occur immediately following closure of passages 110 by the compensating-valve means CV, in which case, fluid from the discharge chamber 79 can return to the reservoir in small volume through the restricted open port 88, and therefore, slight additional pedal travel would be required to take-up the slack in the brake system due to a greater volume of fluid at low pressure being required for shoe-to-drum contact until the compensating port 88 has been closed by the high-pressure piston 145. Upon closure of the compensating ports 88, 110 either simultaneously or in close sequence, continued operator effort applied to said pistons displaces an additional volume of fluid into the discharge chamber 79 to inaugurate a more firm set up of the brakes and, at this stage of the low-pressure operation, back-pressure in the discharge chamber 79 reaches an intensity such that reaction therefrom on the forward end of the reactive piston 181 of the staging valve SV induces rearward relative movement of the same with respect to the piston-carrying member PM, to the position shown in FIGURE 9 and by dashed lines in FIGURE 2 wherein transition from the low-pressure phase to the high-pressure phase has been completed by interconnecting the openings 172, 174 on opposite sides of the low-pressure piston 59, it being recalled that the constant pressure chamber 61 is in continuous communication with the supply reservoir 18 via ports 174, passages 173, valve chamber 135, fluid space 126 encircling the valve rod 180, port 147, fluid space 136, secondary intake port 89, fluid space 87 and primary intake port 19 all as shown in FIGURE 2.

The aforesaid initial operation of the low-pressure piston 59 as a unit with the piston-carrying member PM, disposes the forward edge of the lip 140 of the high-pressure piston seal 139 ahead of the compensating port 88 to cover the same, which operation conditions the high-pressure piston 145 to become effective upon disabling the low-pressure cylinder LPC, that is, equalizing the pressures in chambers 60, 61 to that of atmosphere. Thus, transition from the low-pressure phase to the high-pressure phase is effected by placing the low-pressure working chamber 60 in communication with the supply reservoir 18, and isolating said fluid in the reservoir from that in the discharge chamber 79. The sequence of fluid control to bring about high-pressure operation is as follows:

With the low- and high-pressure pistons 59, 145 initially operated as aforesaid, compensating-valve means CV were actuated to close the cooperating ends of the passages 110 at the instant initial movement of the low-pressure piston 59 was inaugurated, thus conditioning the low-pressure working chamber 60 to displace fluid therefrom under low pressure at high velocity through passages 90 in the wall of the bore liner BL via check-valve means CK into the discharge chamber 79, in opposition to reaction from spring 109. This displacement of fluid at low pressure in large volume serves to quickly take-up the slack in the brake system and to initially pressurize the brake fluid in accordance with the adjusted strength of the staging valve spring 168, meaning that this spring may be installed under different preloaded conditions in accordance with the setting of the tensioning element 165 to vary the pressure point at which transition occurs. The low-pressure phase of brake application is now effective until the staging valve SV is operated to the dashed line position shown in FIGURES 2 and 2A, which operation is induced by backward pressure or reaction on the reactive piston 181 of the staging valve SV from the pressure on the fluid in the discharge chamber 79. Accordingly, upon pressures in the discharge chamber 79 reaching a magnitude substantially corresponding to the spring-loaded status of the staging valve SV, pressure on the fluid in said discharge chamber begins to react on check-valve means CK in cooperation with reaction from spring 109 to firmly seat the same and thereby prevent further displacement of fluid from the low-pressure chamber 60 via passages 90 into the discharge chamber, and, as a consequence, pressures build up in said discharge chamber under sole influence of the high-pressure piston 145 upon additional actuation of the low- and high-pressure pistons 59, 145 as a unit, and react proportionally on the reactive piston 181 connected to the staging valve element 175 to force the same rearwardly to the dashed line position of FIGURES 2 and 2A corresponding to the operated positions of the parts in the FIGURE 9 depiction thereof. This relative shifting of the staging valve SV interconnects the openings 172, 174 to relieve pressure on the fluid in the low-pressure working chamber 60 and thereby equalizes the pressures within said chambers 60, 61 to that of atmospheric pressure which disables the low-pressure cylinder LPC and inaugurates the transition stage from low-pressure operation to high-pressure operation, smoothly and without any noticeable interruption or pulsating effect being transmitted to the brake-pedal.

The aforesaid transitory phase of the braking operation to high pressure operation occurs when the staging valve SV equalizes the pressures in chambers 60, 61 of the low-pressure cylinder LPC by placing the openings 172 in communication with openings 174, the latter openings in turn being connected to the supply reservoir 18 via the fluid return circuit hereinbefore described in detail. Thus pressures in these two chambers will be equal and at atmospheric pressure. This disabling of the low-pressure cylinder LPC to displace fluid at low pressure, is effected notwithstanding compensating-valve means CV are closed, but, upon initial incremental retraction of the low and high pressure pistons 59, 145, to take the brakes "off" these compensating-valve means are instantly opened by the actuating element 120 frictionally moved momentarily with the piston-carrying member PM as a unit, in cooperation with atmospheric pressure conditions first established in chamber 60 by the staging valve SV which released compensating-valve means CV so that fluid from the reservoir 18 could be drawn through the passages 110 into the chamber 60 as a function of a temporary vacuum created by the piston 59, to thus accelerate equalization of pressures in chambers 60, 61 in conjunction with the pressure equalizing function of the staging valve SV. It is thus seen that as the vehicle brakes are taken "off" (released) upon removing pressure from the brake-pedal, the low-pressure piston 59 retracts under influence of its return spring 93 to normal position portrayed in FIGURES 2 and 2A.

Therefore, shifting of the staging valve SV to operating position shown by dashed lines in FIGURES 2 and 2A and corresponding to solid line depiction of the parts in FIGURE 9, retains a higher pressure on the fluid within the discharge chamber 79, the latter chamber being subject to low and high pressure, and to both pressures during transition from the low-pressure phase to the high-pressure phase of braking operation. Accompanied by this retention of higher pressures within the discharge chamber 79, is a lowering of the pressure in the chamber 60 within the larger cylinder LPC until both chambers 60, 61 thereof are balanced at atmospheric pressure, and thereby disabling the low-pressure inducing action of this larger cylinder. It is therefore noted that the function of the staging valve SV is one of balancing the fluid in chambers 60, 61 to that of atmosphere, as one of its operating positions, while the other operating position thereof isolates the chambers 60, 61 to enable low-pressure application to the fluid in chamber 60.

The high-pressure stage of the braking operation now begins with the staging valve SV in its extreme right-hand positions as shown by dashed lines in FIGURES 2 and 2A corresponding to solid line positions of the parts in FIGURE 9, which, in hydraulic brake systems on automotive vehicles and the like, takes place in the final depressing stage of the brake-pedal. Forward or protractive movement of the piston-carrying member PM past the position of FIGURE 2 effects higher pressure actuation of the brake fluid through the medium of the smaller piston 145, and displaces said higher pressurized fluid from the discharge chamber 79 into the brake lines via the discharge outlet 17, thus supplying actuating fluid to the hydraulic wheel cylinders 8 to actuate the associated shoe or disc assembly as the case may be, into frictional engagement with their cooperative member (drum) to brake the vehicle wheels. During such high-pressure operation of the brakes less fluid, of course, is displaced than in the low-pressure stage previously described, and the pressures within chambers 60, 61 and the supply reservoir 18 are all equalized through the open passages 110 and the fluid return circuit which includes the openings 174, passages 173, valve chamber 135, fluid space 126 defined by the valve rod 180 passing through the axial bore incorporated in the extension 75, port 147, fluid space 136, secondary intake port 89, fluid space 87 and primary intake port 19 all as shown in FIGURE 2.

When initial actuation of the brake-pedal is made, operator force is communicated via the push-rod PR to the low-pressure piston 59 which, with the piston 145 immediately effects displacement of a substantially large amount of fluid into the brake lines and therefore takes up the slack in the brake cylinders or motors 8 which actuate their respective frictional assemblies WB associated with the wheels of the motor vehicle, and to thereafter apply braking force as required. Further depressing of the brake-pedal effects additional protraction or forward movement of the piston-carrying member PM and low-pressure piston 59 as a unit until pressure on the fluid in the discharge chamber 79 reaches such a magnitude as to react on the check-valve means CK to maintain the same closed and operate the staging valve SV positively and smoothly with the result that transition from the low-pressure stage to the high-pressure stage ensues, to displace a relatively smaller amount of fluid at relatively higher pressure in response to further protraction of the high-pressure piston 145 with the low-pressure cylinder LPC inactivated. Furthermore, operation of the staging valve SV will be free of erratic and/or pulsating displacement of the fluid into the brake lines 9. Therefore, the staging valve cannot vibrate or fluctuate since its actuating piston 181 is concentrically disposed with respect to the smaller high-pressure piston 145 and, of course, subject to proportional pressure conditions within the discharge chamber 79 to force rearward movement thereof against reaction from the spring 168, such operation of the staging valve taking place smoothly until it reaches its extreme rearward position defined by the right end of the piston 181 in engagement with the shoulder 127 wherein the high-pressure phase of braking has become conditioned to operate the vehicle brakes.

Accordingly, very little operator force is required in the high-pressure stage, the vehicle brakes are operated positively with greatly increased pressure on the brake fluid over that normally available from the conventional single-stage master cylinder.

The following important observations should be given to the operational sequence relating to the closing of compensating-valve means CV and closure of the compensating port 88 to condition the afore-described two-phase pressurizing operation to apply the vehicle brakes. Initial incremental movement of the low-pressure piston 59 from normal fully retracted position shown in FIGURE 2, immediately displaces the movable ring-like valve element 115 of the check-valve means $CV^2$ into abutment with the outer face on the flanged end of said bore liner BL to close the right ends of the passages 110 which terminate at such ends flush with said flange face to close off the flow of fluid from said reservoir 18 into the low-pressure working chamber 60, thereby enabling the low-pressure piston 59 in conjunction with the high-pressure piston 145 to displace into the low-high working chamber 79, fluid under low pressure at high velocity to take-up the slack in the system whether or not the forward edge of the lip 140 on the head seal 139 of piston 145 has overlapped the compensating port 88 to cover the same to cut off flow of fluid from the reservoir 18 into the low-high working chamber 79. The extremely restricted nature of the compensating port 88 being that only an extremely small quantity of fluid from the low-high discharge chamber 79 is conveyed back to the reservoir 18 in contrast to the large volume of fluid being displaced into the low-high discharge chamber 79 by the low-pressure piston 59 via said passages 90 and check-valve means CK. It is therefore, seen that the relative position of the forward end of the lip on the head seal 139 with respect to the compensating port 88 when the pistons 59, 145 are in their respective fully retracted positions as shown in FIGURE 2, enables closing of the compensating port 88 at the same time the compensating passages 110 are closed by compensating-valve means CV, or closure of the former before or following operation of said check-valve means to induce initial build-up of low-pressure conditions within the chamber 79 notwithstanding momentary restricted return flow to the reservoir occurs should the compensating port 88 be closed after passages 110 become closed. Upon a predetermined pressure build up in the discharge chamber 79 under operator-actuation of both pistons 59, 145 as a unit, the low-pressure cylinder LPC becomes inactivated by operation of the staging valve SV to dashed line position depicted in FIGURES 2 and 2A, which equalizes pressures within chambers 60, 61. Upon pressure build up above low-pressure conditions, to a predetermined factor, reaction thereof on the movable element 95 of check-valve means CK combines with the spring load thereagainst to firmly seat said member on the annular face terminating the forward end of the bore liner BL to thereby prevent high back-pressure from reaching the low-pressure working chamber 60 which is vented to the reservoir in the manner previously described in detail. When pressures are relaxed, as when taking the brakes "off," upon removing pressure from the brake-pedal, the movable check-valve element 95 is released to operate to open position against its spring load to enable fluid flow from said low-pressure working chamber 60 via passages 90 to again establish low-pressure conditions within said working chamber 79 in readiness to complete a more firm brake application under high-pressure conditions as aforesaid.

Also another operational characteristic of the present compound master cylinder should be clearly understood, which is the conditioning sequence and operations to place the low-pressure working chamber 60 and the discharge chamber 79 in operative pressurizing condition. The staging valve element 175 conditions in part the low-pressure chamber 60 to pressurize the fluid therein when seated to interrupt communication between chambers 60, 61, but upon closure of compensating-valve means CV, the low-pressure chamber 60 becomes conditioned to displace fluid under low pressure at high velocity through passages 90 and associated check-valve means CK into the discharge chamber 79 upon closure of compensating passages 110, the latter chamber being conditioned to discharge fluid under high pressure at relatively low velocity upon closure of the compensating port 88 by the high-pressure piston seal 139 with the staging valve ball 175 slidably positioned to interconnect the openings 172, 174 which relieve pressure on the fluid in chamber 60 to equal the pressure at atmospheric level on the fluid in chamber 61, and thereby inactivate the low-pressure cylinder LPC.

Upon release of the brake-pedal, the return spring 93 previously additionally compressed above its normally preloaded status, by protraction of the larger piston 59, reacts on the said larger piston to return it along with the piston-carrying member PM, to normal disposition as shown in FIGURES 1 and 2. Retraction of pistons 59, 145 in their respective cylinders, releases operative differential pressures from the head land on the smaller piston 145 and simultaneously causes slight shifting of the staging valve SV forwardly to close the port 179 at a position slightly overlapping or conjointly with respect to opening of the passages 110 by check-valve means CK which places the chamber 60 in communication with the reservoir fluid, and since the chamber 61 is at all times in communication with said reservoir fluid via openings 172 in the hydraulic return circuit previously described, pressures are equalized on opposite sides of the low-pressure piston 59 so that this latter piston along with the smaller high-pressure piston 145 can be established in their respective released positions wherein the lip 140 of the seal 139 is disposed rearwardly of the compensating port 88 to enable the fluid to adjust in volume, and therefore prevent cavitation in the discharge chamber 79 and connected hydraulic lines, to the extent required to maintain the lines full of fluid at a predetermined minimal pressure as defined by the installed load of spring 109 reacting on the residual pressure valve RV, said latter check-valve being retractable from its annular pliant washer seat in conventional fashion to accommodate inflow of the fluid from the wheel cylinders to the discharge chamber 79, and during such retraction of the high-pressure piston 145 to take the brakes "off," a slight vacuum condition may obtain in the discharge chamber ahead of the piston 145 tending to cavitate this chamber. However, fluid from the reservoir 18 may be drawn through the passageways 144 past the released washer valve 142, through the flutes 141 over the lip 140 on the seal 139 to maintain chamber 79 filled, and, upon full retraction of the piston 145, the open compensating port 88 will be effective to convey any excess fluid in chamber 79 back into the reservoir 18 in conventional manner.

In summary, it is impotrant to note that the movable member 95 of check-valve means CK is spring loaded in accordance with the installed preloaded status of spring 109 where this spring is also utilized to control the residual pressure check-valve RV as shown, but each of these check-valve means may be controlled by separate springs installed at different weights, and the invention contemplates such use of separate springs. Referring to compensating-valve means CV which control the passages 110 and which may be actuated into open and closed positions by limited reciprocable movement of the piston-carrying member PM, transmitted by said actuating ring 120 in frictional engagement with the outer surface on said piston member PM. Such force-transmitting actuation of this check-valve means is supplemented by movement, and pressure on the fluid in the low-pressure chamber 60, or this latter medium of actuation may be solely employed, and thus eliminate frictional actuation of the movable element 115 in compensating-valve means CV.

As previously noted, the present compound master cylinder preferably utilizes the low and high pressure displacement members 59, 145 respectively to effect the low-pressure stage, whereupon, operation of the staging valve SV to its dashed line position of FIGURE 2A disables the low-pressure member and conditions the high-pressure member to effect braking control over the vehicle, such low-pressure displacement of fluid into the brake lines taking place notwithstanding the compensating port 88 is open since this passage between the discharge chamber 79 and supply reservoir 18 is of such restriction so as to allow only a fractional portion of the total fluid displaced by both members to return to the reservoir prior to closure of said port. However, the aforesaid initial pressurizing relationship of the low and high pressure members 59, 145, respectively, may be varied, meaning that location of the compensating port 88 with respect to the pressurizing end of the high-pressure member 145 when fully retracted would determine the amount of cooperative fluid displacement thereby during the initial slack-take-up phase of the braking operation, the major portion of which being effected by the larger pressure member 59.

As heretofore pointed out, the staging valve SV utilizes hydraulic pressure differential for its actuation between its two operating positions of control as shown in FIGURE 2 and by dashed lines in FIGURE 2A, respectively. The movable poppet-element 175 of the staging valve is characterized by operating to its two positions with a "snap-action," the normal position being shown in solid lines in FIGURE 2A wherein the low-pressure cylinder is conditioned in part to move fluid at low pressure from said cylinder through the discharge chamber 79 into the discharge port 17 to actuate the wheel brakes, it being recalled that compensating-valve means CV must also be initially moved to close the cooperating open ends of the compensating passages 110 for the low-pressure cylinder LPC to be operative to move fluid at low pressure through passages 90 via check-valve means CK into the discharge chamber 79 until back-pressure reacts therein to stabilize said check-valve means in closed position to block passage of fluid from the low-pressure cylinder LPC which condition occurs during the transitional phase from low- to high-pressure operation. The valve spring 168 supplements the low-pressure fluid in the working chamber 60 to actuate the staging valve element 175 with a "snap-action" to its normal position shown in FIGURES 2 and 2A, and maintains the same in that position until counter-balancing hydraulic back-pressure reacting on the valve-actuating piston 181 overcomes the combined fluid- and spring-pressure reacting on the opposite side of the valve element 175 to impart "snap-action" actuation thereto to its other operating (open) position shown in dashed lines in FIGURE 2A wherein the fluid chambers 60, 61 on opposite sides of the low-pressure piston LP are interconnected to render the low-pressure cylinder inoperative. It is obvious from the disclosure that spring 168 could be eliminated from the staging valve structure and sole reliance placed on the opposing hydraulic pressures for its actuation, but this spring serves an important function of providing means for changing the transitional point between the two phases of braking without modifying the relative working areas of the valve-actuating piston 181 and the staging valve element 175. For example, the higher the installed strength of this spring, a proportionally higher low-pressure operation ensues, since high back-pressure must attain a magnitude sufficient to overcome both the working-pressure plus reaction from said spring before the staging valve SV can be opened to render the low-pressure cylinder inoperative therefore inaugurates high-pressure braking. Spring 168 also serves to stabilize the valve element 175 in correct alignment with its mating seat 178 to insure correct seating at all times, particularly when taking the brakes "off," this spring biases the valve element into seated closed status notwithstanding the low-pressure working chamber 60 is inactive, in readiness for another braking cycle from low- to high-pressure operation. It should be noted here that the working chamber 60 can refill as it expands to prevent cavitation therein during release of the brakes, from fluid admitted through the passages 110 connected via the annular fluid space 87, primary intake port 19 leading to the reservoir 18, but upon initial movement of the low-high pistons in a pressurizing direction, the staging valve element 175 is instantly impinged in seated (closed) condition by low pressure fluid supplemented by reaction from spring 163, said working chamber 60 being fully conditioned to move fluid at low pressure upon closure of the passages 110 by compensating-valve means CV. Accordingly, transition from low- to high-pressure braking may be varied in accordance with the installed strength of the valve spring 168 which also changes the low-pressure operation as a function of the amount of high back-pressure required to overcome said fluid- and spring-pressure to open (unseat) said staging valve 175 therefore disable the low-pressure cylinder.

Use of low hydraulic pressure and high back-pressure against the staging valve element 175 is believed to possess advantages over prior art valves for this purpose which employ back-pressure to open them and spring-pressure alone to close them, since positive operating positions are attained quickly with "snap-action" to produce the shortest possible transitional period between the low- and high-pressure operations which not only provides a correspondingly shorter pedal travel but also a more firm pedal "feel" as well, that is free of sponginess, which if present, produces a feeling of loss-of-pedal momentarily until the high-pressure cylinder is firmly activated.

If the staging valve is not operated quickly and positively to effect transition between the two phases of braking, momentary loss-of-pedal occurs during the transitional phase resulting in a correspondingly longer overall pedal stroke to effect application of the brakes which would defeat the advantages of shorter pedal movement with less operator effort involved.

The present invention has been disclosed in conjunction with the conventional master cylinder body and associated residual pressure check valve as shown, in which the normally located compensating port 20 has been closed off by the bore liner BL, and therefore rendered ineffected to compensate for fluid adjustments between the working chamber 79 and fluid supply 18, such function being taken over by the compensating port 88 in said liner BL as shown. The invention further contemplates that the liner BL may be eliminated, in which case, the intake and compensating ports 19, 20, respectively, normal to the conventional master cylinder body would be retained, but the working cylinder 15 therein would, of course, be smaller in diameter than normal to correspond to the inner diameter of the bore liner BL omitted from the structure. Also the passages 90 and 110 would in such case be incorporated directly in the master cylinder body for control by the two control-valve means CK and CV, respectively, and the cost of smoothly finishing the cylindrical surface which defines the bore 15 as by honing would be eliminated since sealing of the bore liner BL with respect to said bore would no longer be required. In this manner, the master cylinder body would comprise two coaxially stepped cylinders of different diameters in tandem coaxial relationship or, if desired, may have an overlapping relationship depending on the location of the chambers within said body.

From the foregoing description augmented by an inspection of the drawing, it will be seen that I have produced a new and novel conversion unit for the conventional master cylinder body to provide an economical and efficient two-stage fluid pressurizing device, which is operative to smoothly and positively induce high-pressure conditions upon low-pressure conditions first reaching a magnitude under influence of both the low and high pressure pistons 59, 145, at which slack in the brake system is fully taken up, and wherein said conversion unit is easily installed and therefore, suitable for after-market merchandising as well as for original factory equipment. A further advantage lies in the use of the aforesaid bore liner BL which provides for different high-pressure conditions according to the diameter of the inner surface of said liner and mating piston reciprocable therein. Another salient advantage resides in the use of the disclosed self-sealing poppet staging valve SV which eliminates sealing problems and provides at low cost a highly sensitized transition control between the low-pressure operation and the high-pressure operation to apply the brakes with attendant incremental pedal movement required for its operation, and still another important advantage is realized from the utilization of the conventional master cylinder body which eliminates the cost of this component from the overall cost of the two-stage master cylinder MC, thus providing a low-cost, easily installed two-stage master cylinder which retains all of the well known and proven operating characteristics of the single-stage conventional master cylinder, such as "pumping" the pedal to prevent the dangerous "fade" resulting from excess thermal conditions.

It is obvious from the disclosure that the terminology used in the foregoing description and in the appended claims is intended to provide identifying expression and/or terms which convey meanings within a range of reasonable equivalents in the patent sense. For example, the expressions "low-pressure cylinder," "low-pressure unit," "low-pressure chamber," "low-pressure piston or member," larger piston, are intended to include any structure capable of producing low-pressure on a fluid confined within an enclosure and displace the same in large volume therefrom, and wherein a smaller high-pressure producing member is integral or interconnected therewith to produce a high pressurizing operation on the fluid induced by low-pressure operation thereon, whether the low- and high-pressure units are integrated in a single body or utilized in separate bodies forming a unitary assembly. The terms "forward," "rearward," "righthand," "upper," "lower," "top," "bottom," and other directional words and characters are intended to have only relative connotation for convenience in describing the structure as it appears on the drawing, and are not intended to be interpreted as requiring any particular orientation with respect to related structure or the operating position in which the present disclosure is commercially mounted.

The preferred embodiment of the invention has been illustrated and described. It should be understood, however, that the invention contemplates any and all modifications, substitutions and/or arrangements of the parts comprising the same that may fall within the purview of the claims hereunto appended.

Having thus described my invention, I claim:

1. In a multi-stage master cylinder for hydraulic brake systems, having a chamber-defining body provided with a high pressure cylinder open at one end and closed at the other, a discharge outlet through the closed end, a co-axial low-pressure cylinder closed at both ends, a fluid supply reservoir, a reciprocable piston-carrying member having mounted thereon a high-pressure piston normally disposed at one end of said high-pressure cylinder and a spaced low-pressure piston normally disposed at one end of said low-pressure cylinder, a low-high pressure discharge chamber in the high-pressure cylinder, defined by the closed end thereof and said high-pressure piston spaced therefrom, a low-pressure working chamber on one side of said low-pressure piston, a constant pressure chamber on the opposite side of said low-pressure piston, a compensating port through the wall of the high-pressure cylinder for normally interconnecting the fluid reservoir with said discharge chamber when said high-pressure piston is disposed at one end of its cylinder, an annular fluid space encircling that portion of the piston-carrying member reciprocable in said high-pressure cylinder, an intake port through the wall of said high-pressure cylinder for maintaining said fluid reservoir in communication with said fluid space, the improvement which comprises: a plurality of passages in said chamber-defining body communicating with said low-pressure working chamber and said discharge chamber, check-valve means including a spring-loaded element normally overlying the forward ends of said passages to block rearward fluid flow therethrough, and movable to accommodate forward fluid flow through said passages into said discharge chamber, a different plurality of passages in said chamber-defining body communicating with said supply reservoir and said low-pressure working chamber, compensating-valve means including a valve-forming element movable relatively to said chamber-defining body to open and close said different passages, a frictional connection between said valve-forming element and piston-carrying member, and normally effective under initial movement of said piston-carrying member in a fluid pressurizing direction at any selected position thereof along its full operating stroke, to correspondingly move said valve-forming element as a unit to close said different passages for low-pressure operation, a counterbore in the high-pressure and low-pressure ends of the piston-carrying member, an axial bore in said piston-carrying member interconnecting said counterbores, a staging valve-forming element movably mounted in the counterbore defining the low-pressure end of the piston-carrying member, fluid passage means incorporated in that portion of the piston-carrying member on which the low-pressure piston is mounted, said last-mentioned means being controllable by said valve-forming element to disconnect said working and constant pressure chambers in said low-pressure cylinder for low-pressure operation, and to connect said working and constant pressure chambers to negate low-pressure operation, a reactive piston slidably mounted in the counterbore defining the high-pressure end of said piston-carrying member, a valve actuating rod engaged at its forward end by said reactive piston and extending through the said axial bore with its rear end slightly spaced from the confronting end of said valve-forming element when the latter element is effective to disconnect said chambers in the low-pressure cylinder, said valve rod serving to transmit movement of the reactive piston under influence of proportional pressure conditions on the fluid in the discharge chamber, to dispose the valve-forming element in its operating position of control wherein said chambers in the low-pressure cylinder are connected to negate low-pressure operation, a pair of cooperating abutment-engaging elements mounted on said valve-forming element and said piston-carrying member respectively to establish the limits of the relative operating movement of said valve-forming element to open position, a normally preloaded spring operably disposed in the counterbore at the low-pressure end of the piston-carrying member to react between the latter member and said valve-forming element to bias the latter member into normal position wherein the chambers in the element are connected, a port in the piston-carrying member interconnecting the axial bore therein with said fluid space, an operator-operated member having a normally released position for moving said piston-carrying member in a fluid pressurizing direction, and spring means including a normally preloaded spring for opposing operator-actuation of said piston-carrying member.

2. In a multi-stage master cylinder, having a chamber-defining body, a variable pressure discharge chamber in said body provided with a discharge port, a fluid supply reservoir in said body, a wall separating said chamber from said reservoir, a reciprocable high-pressure smaller piston having working relation with said discharge chamber, and a compensating port through the separating wall normally open to interconnect said reservoir with said discharge chamber when said piston is fully retracted, a low-pressure working chamber in said body, a piston of larger diameter than the first-mentioned piston adapted to work in said low-pressure working chamber to one side thereof, the opposite side of said low-pressure piston defining one side of a constant pressure chamber in said body coaxial with said low-pressure chamber, the improvement which comprises: a passage in said chamber-defining body communicating with said low-pressure working chamber and said discharge chamber; check-valve means including a spring-loaded element normally overlying the forward ends of said passages to block rearward fluid flow therethrough, and movable to accommodate forward fluid flow through said passages into said discharge chamber; a different passage in said chamber-defining body communicating with said supply reservoir and said low-pressure working chamber; compensating-valve means including a valve-forming element movable relatively to said chamber-defining body to open and close said different passage; a frictional connection between said valve-forming element and piston-carrying member, and normally effective under initial movement of said piston-carrying member in a fluid pressurizing direction at any selected position thereof along its full operating stroke, to correspondingly move said valve-forming element as a unit to close said different passage for low-pressure operation; an axial bore extending from the working end of said smaller piston into a counterbore terminating at the opposite end thereof; an opening through the bore wall in said smaller piston; a staging-valve element movable in said axial bore, and having its forward end exposed to said discharge chamber; a normally preloaded spring reacting on said staging-valve element to bias the same toward closed position; a blind axial bore extending from the opposite end of said staging-valve element to a predetermined depth; a pair of spaced openings through the bore wall in said smaller piston, one of said openings interconnecting the low-pressure chamber with said counterbore, and the other of said openings being adapted to interconnect said constant pressure chamber with said axial bore; a port between said axial bore and counterbore controlled by the staging-valve element; an intake port through said separating wall for interconnecting said first-mentioned opening with said reservoir; and an operator-operated member connected to the said pistons to move them as a unit from normal positions to initially displaced fluid from said low-pressure working chamber at high velocity through said check-valve means into said discharge chamber, and dispose the working end of said smaller piston ahead of said compensating port to isolate the fluid in the reservoir from said discharge chamber whereby, upon low pressure in said discharge chamber reaching a predetermined magnitude to overcome the spring load on said staging-valve element to displace the same relatively to said smaller piston and thereby interconnect the said pair of openings to interconnect the said low-pressure working chamber and constant pressure chamber to equalize the pressures therein to that of atmosphere to negate low-pressure operation and render the smaller piston effective to produce high pressures on the fluid at low velocity in said discharge chamber.

3. In a two-stage master cylinder having a fluid supply reservoir, a low-pressure cylinder, a low-pressure piston slidable therein, a high-pressure cylinder having a tubular liner coaxial with said low-pressure cylinder, a high-pressure piston of smaller diameter than said low-pressure piston, slidable in said tubular liner as a unit with said low-pressure piston, a low-high variable pressure discharge chamber adapted to receive actuating fluid from said low and high pressure cylinders, a discharge outlet for said low-high discharge chamber, the improvement which comprises: a passage in said tubular liner communicating with said low-pressure working chamber and said discharge chamber; check-valve means including a spring-loaded element normally overlying the forward end of said passage to block rearward fluid flow therethrough, and movable against its spring load to accommodate forward fluid flow through said passage into said discharge chamber; a different passage in said tubular liner communicating with said supply reservoir and said low-pressure working chamber; compensating-valve means including a valve-forming element movable relatively to said tubular liner to open and close said different passage; a frictional connection between said valve-forming element and piston-carrying member, and which is normally effective under initial movement of said piston-carrying member in a fluid pressurizing direction at any selected position thereof along its full operating stroke, to correspondingly move said valve-forming element as a unit to close said different passage for low-pressure operation; an annular fluid space in said tubular liner communicating with said reservoir via an intake port between the high-pressure cylinder and said reservoir; a compensating port in the tubular liner normally open between the fluid space aforesaid and high-pressure cylinder when the high-pressure piston is fully retracted; spring means including a normally preloaded spring reacting on the low-pressure piston to establish the normal positions of said latter piston and the high-pressure piston wherein both pistons are fully retracted; relief valve means including an element movably disposed in an axial bore coextensive with said low and high pressure pistons, to control a pair of spaced radial openings in said low-pressure piston, one on each side thereof, whereby interconnection of said openings by said relief valve element equalizes the pressures on opposite sides of said low-pressure piston to negate low-pressure operation; a normally preloaded spring in said axial bore for reacting between said low-pressure piston and said relief valve element to bias the same toward normal position wherein said radial openings are disconnected to condition in part the low-pressure cylinder to pressurize the fluid therein, said relief valve element being movable to operating position to interconnect said radial openings under low-pressure actuation from the fluid in said low-high discharge chamber at low-pressure operating condition to thereby effect transition from the low-pressure cylinder to the high-pressure cylinder upon closure of the compensating port by the working end of said high-pressure piston when low pressure in said low-high discharge chamber exceeds a predetermined value; and an operator-operated member having a normally released position from which it is operable to actuate both pistons as a unit to produce low-pressure conditions within said low-high discharge chamber followed by movement of said relief valve means to operating position to equalize the pressures on opposite sides of said low-pressure piston and thereby inactivate said low-pressure cylinder, and activate said high-pressure cylinder to produce high pressure conditions within said low-high discharge chamber.

4. In a two-stage master cylinder having a chamber-defining body provided with a fluid supply reservoir, a low-pressure cylinder, a low-pressure piston slidable therein, a high-pressure cylinder coaxial with said low-pressure cylinder, a high-pressure piston of smaller diameter than said low-pressure piston, slidable in said high-pressure cylinder as a unit with said low-pressure piston, a low-high variable pressure discharge chamber adapted to receive actuating fluid from said low and high-pressure cylinders, a discharge outlet for said low-high discharge chamber, the improvement which comprises: a passage in said chamber-defining body communicating with said low-pressure working chamber and said discharge chamber; check-valve means including a spring-loaded element normally overlying the forward ends of said passage to block rearward fluid flow therethrough, and movable against its spring load to accommodate forward fluid flow through said passage into said discharge chamber; a different passage in said chamber-defining body communicating with said supply reservoir and said low-pressure working chamber; compensating-valve means including a valve-forming element movable relatively to said chamber-defining body to open and close said different passage; a frictional connection between said valve-forming element and piston-carrying member, and which is normally effective under initial movement of said piston-carrying member in a fluid pressurizing direction at any selected position thereof along its full operating stroke, to correspondingly move said valve-forming element as a unit to close said different passage for low-pressure operation; an annular fluid space on said high-pressure piston; a compensating port normally open between said reservoir and low-high discharge chamber when said pistons are fully retracted; an intake port establishing continuous fluid communication between said reservoir and said fluid space; spring means including a normally preloaded spring reacting on said low-pressure piston to establish the normally fully retracted positions of both of said pistons; relief valve means including an element movably disposed in an axial bore coextensive with said pistons, to control a pair of radial openings in said low-pressure piston, one on each side thereof, whereby interconnection of said openings by said relief valve element equalizes the pressures on opposite sides of said low-pressure piston to negate low-pressure operation; a normally preloaded spring in said axial bore reacting between said pistons and said relief valve element to bias the same to normal position wherein said radial openings are disconnected, said relief valve element being movable to operating position to interconnect said radial openings under low-pressure actuation from the fluid in said low-high discharge chamber at low-pressure operating condition to thereby effect transition from the low-pressure cylinder to the high-pressure cylinder upon closure of said compensating port by the working end of said high-pressure piston when low pressure in said low-high discharge chamber exceeds a predetermined value, and an operator-operated member having a normally released position from which it is operable to actuate both pistons to produce low-pressure conditions within said low-high discharge chamber followed by movement of said relief valve means to operating position to equalize pressures in said low-pressure cylinder and thereby inactivate said latter cylinder, and activate said high-pressure cylinder to produce high pressure conditions within said low-high discharge chamber.

5. In a master cylinder of the character disclosed having a chamber-defining body, an axially bored chamber closed at one end and open at the other, a fluid supply reservoir in said body separated from said chamber by a wall, an intake port through said separating wall for maintaining fluid communication between said reservoir and chamber, a removable tubular member telescopically fixed in said axially bored chamber in close tolerance relationship therewith to effect a fluid-tight seal therebetween, an external annular fluid channel in the outer surface of said tubular member in continuous fluid communication with said reservoir via said intake port, and another intake port through the wall of said tubular member for interconnecting the said annular fluid channel with the interior of said tubular member, a thrust-transmitting member operably projecting in part into said tubular member, the inner end of which is spaced from the closed end of said axially bored chamber, to provide a discharge chamber therebetween, the latter chamber communicating with the exterior of said body via a discharge port through said closed end, the improvement which comprises: a counterbored chamber in said body coaxial with said axially bored chamber, and having both ends closed, with one end centrally apertured; a high-pressure piston defining the inner end portion of said thrust-member, a compensating port through the wall of said tubular member normally interconnecting said annular fluid channel with said discharge chamber, said compensating port being controlled by said high-pressure piston to isolate the fluid in said fluid channel from that in said discharge chamber upon initial movement thereof, a low-pressure piston of larger diameter than said high-pressure piston, mounted on said thrust-member, and having a cylindrical extension coaxial with said thrust-member, projecting through the apertured end wall of said counterbored chamber, said larger piston being reciprocable in said counterbored chamber and defining therewith a low-pressure chamber on one side thereof and a constant pressure chamber on the opposite side thereof; a plurality of passages in said tubular member communicating with said low-pressure working chamber and said discharge chamber; check-valve means including a spring-loaded element normally overlying the forward ends of said passages to block rearward fluid flow therethrough, and movable against its spring load to accommodate forward fluid flow through said passages into said discharge chamber; a different plurality of passages in said tubular member communicating with said annular fluid channel and said low-pressure working chamber; compensating-valve means including an annular valve-forming element movable relatively to said tubular member to open and close said different passages; a frictional connection slidably mounted on a portion of the member between said low- and high-pressure pistons, and which is mechanically connected to said valve-forming element to slide as a unit therewith, whereby minute reciprocable movements of said thrust member at any selected position along its full operating stroke is effective to correspondingly move the valve-forming elements as a unit to open and close, respectively, said different plurality of passages for negating low-pressure operation and rendering the latter operation operative, respectively; an axially bored extension coextensive with said thrust-member; an abutment wall in said last-mentioned axial bore defining a valve chamber therebetween; relief valve means including an element reciprocable in said valve chamber; limiting means effective between said valve element and thrust-member for defining the limits of reciprocable movement thereof; an opening through the bore wall of said thrust-member for interconnecting said axial bore with said constant pressure chamber; another opening through the bore wall of said thrust-member for interconnecting said low-pressure chamber with the valve chamber in said thrust-member; a third opening through the bore wall of said thrust-member, interconnecting an annular fluid channel on the exterior of said thrust-member projecting into said axially bored chamber with said axial bore; a normally preloaded spring operatively disposed in said low-pressure chamber to react between said body and larger piston to establish the latter in its normally released position; another normally preloaded spring operably disposed in said valve chamber between the valve element and said abutment wall for biasing said valve element into its normal disposition wherein said valve chamber is disconnected from said opening leading to the constant pressure chamber to thereby condition in part the low-pressure chamber to displace fluid therefrom at low pressure in large volume into said discharge chamber via said check-valve means, said valve element being responsive to pressure conditions in said discharge chamber induced by initial movement of both pistons upon closure of said different passages by said compensating valve means and closure of said compensating port by said piston on the thrust-member in that order, to interconnect the low and constant pressure chamber via their associated openings to balance pressures in said chambers and thereby disable the low-pressure chamber to render the high pressures effective by said thrust-member; and means adapted to actuate said thrust-member and pistons as a unit.

6. A master cylinder constructed in accordance with claim 5 in which said spring-loaded check-valve means comprise: a movable cup-shaped member having a vertical wall provided with a central circular opening, a horizontal cylindrical wall, an outturned circular flange normal to said horizontal wall, an annular facing bonded to one side of the outturned flange and normally abutting the forward end of said tubular member to close the ends of the first-mentioned plurality of associated passages, and a normally preloaded spring reacting between said outturned flange and confronting portion on the closed end of said axially bored chamber, to yieldably control movement of said movable member into and out of abutting engagement with the forward end of said tubular member.

7. A master cylinder constructed in accordance with claim 5 in which the construction of the aforesaid tubular member includes: an annular outstanding flange defining the rear end thereof; a reduced cylindrical extension formed by diminishing the normal diameter of said tubular member and which extends rearwardly from the flanged end, and on which said valve-forming element is slidably mounted; an annular face portion on the flanged end of said tubular member; an annular external groove adjacent the end of said last-mentioned extension in spaced relation to said face portion; a split retaining ring engaging said groove to define with said face portion the relative sliding movement of said valve-forming element; an annular member axially spaced from said valve-forming element, in radially spaced relation to said piston-carrying member; a plurality of circumferentially spaced elements adapted to join said annular member and valve-forming element in a coaxial assembly for sliding movement as a unit; and an external annular groove in said actuating element for receiving the inner peripheral portion of said annular member for axial movement as a unit and accommodating relative radial movement of said actuating element with respect to said annular member, whereby said minute reciprocable movements of said piston-carrying member selectively dispose said valve-forming element in abutting relation with respect to said face portion on said flanged end of said tubular member, to close the confronting ends of said different passages terminating flush with said face portion, and in abutting relation with respect to said split retaining ring to open the confronting ends of said different passages, said frictional engagement of said actuating element accommodating relative sliding movement of said piston-carrying member upon the latter establishing the valve-forming element in either of its said abutting positions, in the same direction in which the existent position was effected toward the correspondng extreme of the full operating stroke of said piston-carrying member.

8. In a master cylinder of the character disclosed having a chamber-defining body, an axially bored chamber closed at one end and open at the other, a fluid supply reservoir in said body separated from said chamber by a wall, an intake port through said separating wall for maintaining fluid communication between said reservoir and chamber, a thrust-transmitting member operably projecting in part into said axial chamber, the inner end of which is spaced from the closed end of said axial chamber to provide a discharge chamber therebetween which is communicable with the exterior of said body via a discharge port through said closed end, the improvement which comprises: a counterbored chamber in said body coaxial with said axial chamber, and having both ends closed, with one end centrally apertured; a high-pressure piston defining the inner end portion of said thrust-member; a compensating port through said separating wall normally interconnecting said reservoir with said discharge chamber, said compensating port being controlled by said high-pressure piston to isolate the fluid in said reservoir from that in said discharge chamber upon initial movement thereof; an annular fluid chamber on that portion of said thrust-member projecting into said axial chamber, and adapted to have continuous communication with said intake port; a low-pressure piston mounted on said thrust-member and of larger diameter than said high-pressure piston, and having a cylindrical extension coaxial with said thrust-member projecting through the apertured end wall of said counterbored chamber, said larger piston being reciprocable in said counter-bored chamber and defining therewith a low-pressure working chamber on one side thereof and a constant pressure chamber on the other side thereof; a passage in said chamber-defining body communicating with said low-pressure working chamber and said discharge chamber; check-valve means including a spring-loaded element normally overlying the forward ends of said passage to block rearward fluid flow therethrough, and movable against its springload to accommodate forward fluid flow through said passage into said discharge chamber; a different passage in said chamber-defining body communicating with said annular fluid chamber and said low-pressure working chamber; compensating-valve means including a valve-forming element movable relatively to said chamber-defining body to open and close said different passage; a frictional connection between said valve-forming element and thrust-member, and which is effective under minute reciprocable movements of said thrust-member at any selected position thereof along its full operating stroke, to correspondingly move said valve-forming element as a unit to open and close, respectively, said different passage for negating low-pressure operation and rendering the latter operation operative; an axial bore coextensive with said thrust-member; an abutment wall in said last-mentioned axial bore defining a valve chamber therebetween; relief valve means including an element reciprocable in said valve chamber; limiting means effective between said relief valve element and thrust-member for defining the limits of reciprocable movement thereof; an opening through the bore wall of said thrust member for interconnecting said axial bore with said constant pressure chamber; another opening through the bore wall of said thrust-member for interconnecting said low-pressure chamber and valve chamber in said thrust-member; a third opening through the bore wall of said thrust-member, interconnecting an annular channel on the exterior of said thrust-member projecting into said axially bored chamber with said axial bore; a normally preloaded spring operatively disposed in said low-pressure chamber to react between said body and larger piston to establish the latter in its normally released position; another normally preloaded spring operably disposed in said valve chamber between the relief valve element and said abutment wall for biasing said latter element into its normal disposition wherein said valve chamber is disconnected from the opening leading to the constant pressure chamber to thereby condition in part the low-pressure chamber to displace fluid therefrom in large volume into said discharge chamber via said check-valve means, said relief valve element being responsive to pressure conditions in said discharge chamber induced by initial movement of both of said pistons upon closure of said different passage by said compensating-valve means and closure of said compensating port by said piston on the thrust-member in that order, to interconnect the low and constant pressure chambers via their associated openings to balance pressures in said chambers and thereby disable the low-pressure chamber to render high pressures effective by said thrust-member; and means adapted to actuate said thrust-member and pistons as a unit.

9. In multi-stage master brake cylinders having a chamber-defining body provided with a fluid supply reservoir, a high-pressure chambered bore and a low-pressure chambered counterbore, said bores having a smaller piston and a larger piston with a working side, respectively, and reciprocably mounted therein to move as a unit, a discharge passage associated with said high-pressure bore, a compensating port in said chamber-defining body normally interconnecting said supply reservoir and high-pressure bore when said smaller piston is fully retracted, and closable thereby in response to initial pressurizing movement thereof for high-pressure operation, the combination with check-valve means having a spring-loaded element interposed in a passage in said chamber-defining body, and which communicates with the working side of said larger piston and said discharge passage, to control said passage whereby fluid flow from the discharge passage is prevented; compensating-valve means having a valve-forming element operatively associated with a different passage in said chamber-defining body, and which communicates with said supply reservoir and the working side of said larger piston, said valve-forming element being movable relatively to said different passage to block and to unblock the same for the larger piston to be operative to displace fluid through said first-named passage and check-valve means at low pressure, and for negating the operativeness of said larger piston in favor of said smaller piston to displace fluid directly through said discharge passage at high pressure; frictional means connecting said valve-forming element for operation by said pistons when initially moved as a unit in opposite directions at closely spaced stations along their full operating stroke, to selectively move said valve-forming element to block and to unblock said different passage; and staging valve means having an element interposed in a passage in said larger piston and which communicates with the working and the non-working opposite side of the latter piston, said staging valve element having a normal position under spring-actuation to block said last-named passage, and thereby isolate working and non-working sides of said larger piston to enable the working side of the latter to be effective to displace fluid at low pressure through said first-named passages and check-valve means when said valve-forming element is blocking fluid flow through said different passage, and to another position under fluid-pressure actuation developed at said discharge passage ahead of said smaller piston, to unblock said passage in the larger piston, and thereby place the working and non-working sides of said larger piston in communication with each other to negate low-pressure operation by said larger piston.

References Cited in the file of this patent
UNITED STATES PATENTS

| | | |
|---|---|---|
| 2,031,360 | Boughton | Feb. 18, 1936 |
| 2,190,238 | Lepersonne | Feb. 13, 1940 |
| 2,289,525 | Swift | July 14, 1942 |
| 2,354,957 | Loweke | Aug. 1, 1944 |
| 2,392,501 | Pool | Jan. 8, 1946 |
| 2,410,169 | La Brie | Oct. 29, 1946 |
| 2,489,596 | Swain et al. | Nov. 29, 1949 |
| 2,699,179 | Hansen et al. | Jan. 11, 1955 |
| 2,820,347 | Highland et al. | Jan. 21, 1958 |
| 2,896,663 | Mena | July 28, 1959 |